(12) United States Patent
Davies et al.

(10) Patent No.: US 10,178,127 B2
(45) Date of Patent: Jan. 8, 2019

(54) SECURED MOBILE COMMUNICATIONS DEVICE

(71) Applicant: BAE SYSTEMS plc, London (GB)

(72) Inventors: Owain Thomas James Davies, Guildford (GB); Andrew John Roberts, Guildford (GB)

(73) Assignee: BAE Systems plc, London (GB)

(*) Notice: Subject to any disclaimer, the term of this patent is extended or adjusted under 35 U.S.C. 154(b) by 0 days.

(21) Appl. No.: 14/916,802

(22) PCT Filed: Sep. 8, 2014

(86) PCT No.: PCT/GB2014/052711
§ 371 (c)(1),
(2) Date: Mar. 4, 2016

(87) PCT Pub. No.: WO2015/033166
PCT Pub. Date: Mar. 12, 2015

(65) Prior Publication Data
US 2016/0205139 A1    Jul. 14, 2016

(30) Foreign Application Priority Data

Sep. 6, 2013 (GB) .................................. 1315931.4

(51) Int. Cl.
H04L 29/06    (2006.01)
G06F 21/57    (2013.01)
G06F 21/62    (2013.01)

(52) U.S. Cl.
CPC .............. *H04L 63/20* (2013.01); *G06F 21/57* (2013.01); *G06F 21/629* (2013.01); *H04L 63/0227* (2013.01); *H04L 63/10* (2013.01)

(58) Field of Classification Search
CPC .............................. H04L 63/20; H04L 63/10
See application file for complete search history.

(56) References Cited

U.S. PATENT DOCUMENTS 8,341,736 B2*  12/2012  Reasor .................. G06F 21/566
                                                              713/165
8,352,998 B1*   1/2013  Kougiouris ............. H04L 63/20
                                                              726/1

(Continued)

FOREIGN PATENT DOCUMENTS

WO    2007053848 A1    5/2007
WO    2004057834 A2    7/2014
WO    2015033166 A1    3/2015

OTHER PUBLICATIONS

International Preliminary Report on Patentability received for Patent Application No. PCT/GB2014/052711 dated Mar. 17, 2016. 7 pages.

(Continued)

*Primary Examiner* — Jason K Gee
(74) *Attorney, Agent, or Firm* — Finch & Maloney PLLC

(57) ABSTRACT

A method is provided for securing a mobile communications device to a level required for accessing a network, for example a secured enterprise network, by means of a public network such as the Internet. A mobile communications device is also provided incorporating functionality to enable centralized control over the configuration of the mobile device and thereby to control the actions of users of that device and of applications software that may be installed and executed on that device. Furthermore, a system is provided to implement a mobile communications infrastructure for an enterprise network with centralized control over the configuration of mobile communications devices within the system.

23 Claims, 3 Drawing Sheets

(56) References Cited

U.S. PATENT DOCUMENTS

| | | | | |
|---|---|---|---|---|
| 2003/0061166 A1* | 3/2003 | Saito | ............... | G06F 21/6218 |
| | | | | 705/54 |
| 2009/0049518 A1* | 2/2009 | Roman | ............... | H04L 41/0893 |
| | | | | 726/1 |
| 2010/0031325 A1* | 2/2010 | Maigne | ............... | G06F 9/45533 |
| | | | | 726/4 |
| 2010/0050232 A1* | 2/2010 | Peterson | ............... | G06F 21/6236 |
| | | | | 726/1 |
| 2011/0296487 A1* | 12/2011 | Walsh | ............... | G06F 21/10 |
| | | | | 726/1 |
| 2013/0227090 A1* | 8/2013 | Nissler | ............... | G06F 21/57 |
| | | | | 709/220 |
| 2014/0289511 A1* | 9/2014 | Tuch | ............... | H04L 63/0823 |
| | | | | 713/156 |

OTHER PUBLICATIONS

International Search Report and Written Opinion received for Patent Application No. PCT/GB2014/052711 dated Nov. 14, 2014. 9 pages.

* cited by examiner

SECURED MOBILE COMMUNICATIONS DEVICE

This invention relates to secured terminal equipment for use in communicating over a network, in particular but not exclusively to a mobile communications device whose configuration may be defined and secured for use in communicating with a secured network, for example a corporate or other enterprise network, by means of an unsecured network (such as the Internet).

An enterprise may have an arrangement with a particular mobile telecommunications service provider to provide a secure corporate mobile service to employees using secure mobile devices issued by the service provider and configured to access enterprise services and resources to the exclusion of all others. For example, Blackberry® devices may be supplied by the selected mobile services provider and configured with exclusive access to the enterprise e-mail system. In principle, no other device linked to the mobile service provider's network would have access to the enterprise network or resources.

However, there is an increasing demand for enterprises to be able to offer mobile access to their networks from any suitably configured mobile communications device, irrespective of the mobile service provider to which the user or the enterprise subscribes, but without compromising the security of the enterprise network. With such a capability, the enterprise would be able to enter into a simpler arrangement with a number of mobile service providers to allow employee access to the enterprise network from a greater variety of mobile devices, without compromising security.

In a first aspect, the present invention resides in a communications device for accessing, by means of a first network, data resources hosted on a second network, the communications device having processing means for executing an installed operating system, the operating system incorporating:

means for communicating with a defined policy server on the second network to receive, by secure means, a policy file therefrom defining a configuration to be implemented by and within the operating system of the communications device; and means for controlling the implementation, by one or more respective modules of the operating system, of a configuration defined in a received policy file.

In this way, centralised control over certain aspects of the configuration of a communications device may be exercised which, being implemented in the operating system of the communications device, limit user action to over-ride the intended controls implemented through that configuration.

In one embodiment, the policy file defines, according to a predetermined structure, different portions of a configuration to be implemented by different modules of the operating system and wherein the means for controlling the implementation are arranged to make each said different portion of a defined configuration available to the respective module of the operating system for implementation.

In a further embodiment, the defined configuration defines secure means by which a user of the communications device may access the data resources hosted on the second network.

In a further embodiment, the configuration is defined as a layered hierarchy of configuration sub-policies, including rules by which configuration elements associated with one layer may over-ride configuration elements associated with a different layer of the hierarchy and wherein the means for controlling the implementation are arranged to apply said rules in the implementation of a defined configuration on the communications device.

A hierarchical policy structure enables not only the layered definition of a configuration policy, but also a layered application of the policy across a number of different communications devices.

However, common elements of a configuration may be defined for application to all communications devices. In such an embodiment, a sub-policy associated with a base layer of the hierarchy comprises a base configuration to be applied to all communications devices arranged with access to the second network.

In a further variant, a sub-policy associated with a layer other than the base layer of the hierarchy is defined for implementation on a communications device associated with each of a sub-group of users having access to the second network.

In a further embodiment, the configuration defines one or more actions to be triggered by the operating system of the communication device upon detection of a predetermined event, the predetermined event comprising one or more conditions detectable by the operating system. With this facility, in a communications device according to the present invention having one or more installed sensors, the predetermined event comprises detection of at least one of:

a predetermined combination of sensor data from the one or more sensors;

a predetermined battery charge level;

a predetermined environmental condition;

a predetermined communications event relating to the first or the second network;

receipt of a predetermined signal or signal type over an interface of the communications device;

a predetermined profile of motion of the communications device;

an unsafe condition;

a predetermined user action; and a predetermined status condition.

However, the range of events that may be defined according to this embodiment of the present invention is limited only by what may be detected using the facilities available to the operating system or to applications software executing on the communications device.

In a further embodiment, the one or more actions include at least one action selected from:

control of access, by applications software executing on the communications device, to defined facilities provided by the operating system, control of access to data from the one or more sensors;

deletion of predetermined types of data from the communications device;

control of access to defined network addresses on the first or second networks;

control of access to communications facilities of the communications device;

sending of a message to a defined recipient on the first or second network; and sending of an indication of the location of the communications device to a defined recipient on the second network.

However, the range of actions that may be defined according to this embodiment of the present invention is limited only by what may be implemented using the facilities available to the operating system or to applications software executing on the communications device.

In a particular variant, the action comprises restriction of access to data from the one or more sensors upon detection of an event comprising the presence of the communications device at or near to a predetermined location.

This facility is particularly useful where the device enters a known high security area in which access to camera, microphone or other sensor data by software executing on the communications device may lead to a breach of security.

In a further embodiment, a configuration defines a policy filter, the policy filter defining one or more conditions for implementation of a respective portion of the configuration and wherein the means for implementing a configuration are arranged, upon detection of a defined filter condition, to trigger implementation of a respective portion of the configuration.

In one variant, the policy filter defines one or more events or event combinations detectable by the operating system of the communications device.

In a further embodiment, the operating system further comprises a policy editor enabling an authorised user to generate and to transfer to the policy server at least a portion of a policy file defining one or more elements of a configuration for implementation on one or more further communications devices.

In this way, an appropriately authorised user may control the configuration of other communications devices from one communications device using the policy file mechanism.

In a further variant of this facility, the policy editor further comprises means for testing the one or more user-defined elements of a configuration on the communications device before transfer to the policy server.

In a further embodiment, the operating system further comprises an audit module for capturing event data generated by modules of the operating system according to a configuration defined in the received policy file, and for transmitting the captured event data to an audit server hosted on the second network.

In a further embodiment, the means for controlling implementation of a configuration include means for implementing a roll-back facility to restore an earlier state of configuration for the communications device.

In a particular implementation, the policy file defines a configuration using a file structure defined according to a predetermined XML schema.

In one possible application of the present invention, the communications device is a mobile communications device and the first network is a mobile communications network. In particular, the operating system is the Android® operating system.

In a second aspect, the present invention resides in a communications system, comprising a first network and a second network and a plurality of communications devices linked to the first network and configured to enable users of those devices to access data resources linked to the second network, the second network having a policy server linked thereto to transmit, by secure means, to selected ones of the plurality of communications devices a policy file defining a configuration to be implemented on the selected communications device as a condition for access to data resources linked to the second network, wherein each of the plurality of communications devices includes processing means for executing an installed operating system, the operating system incorporating:

means for communicating with the policy server to receive, by said secure means, a policy file therefrom defining a configuration to be implemented by and within the operating system of the communications device; and means for controlling the implementation, by one or more respective modules of the operating system, of a configuration defined in a received policy file.

In one implementation of the system, one or more of the plurality of communications devices is a communications device according to the first aspect of the present invention.

In a third aspect, the present invention resides in a computer program product comprising a computer readable medium, or means for access thereto, having stored thereon a computer program or suite of computer programs which, when installed and executed on a communications device, implements a communications device according to the first aspect of the present invention.

In a fourth aspect, the present invention resides in an operating system for a mobile communications device, comprising a computer program or a suite of computer programs which when loaded and executing on a processor of the communications device is arranged to implement a communications device according to the first aspect of the present invention.

Preferred embodiments of the present invention will now be described in more detail, by way of example only, and with reference to the accompanying drawings of which:

Figure 1:
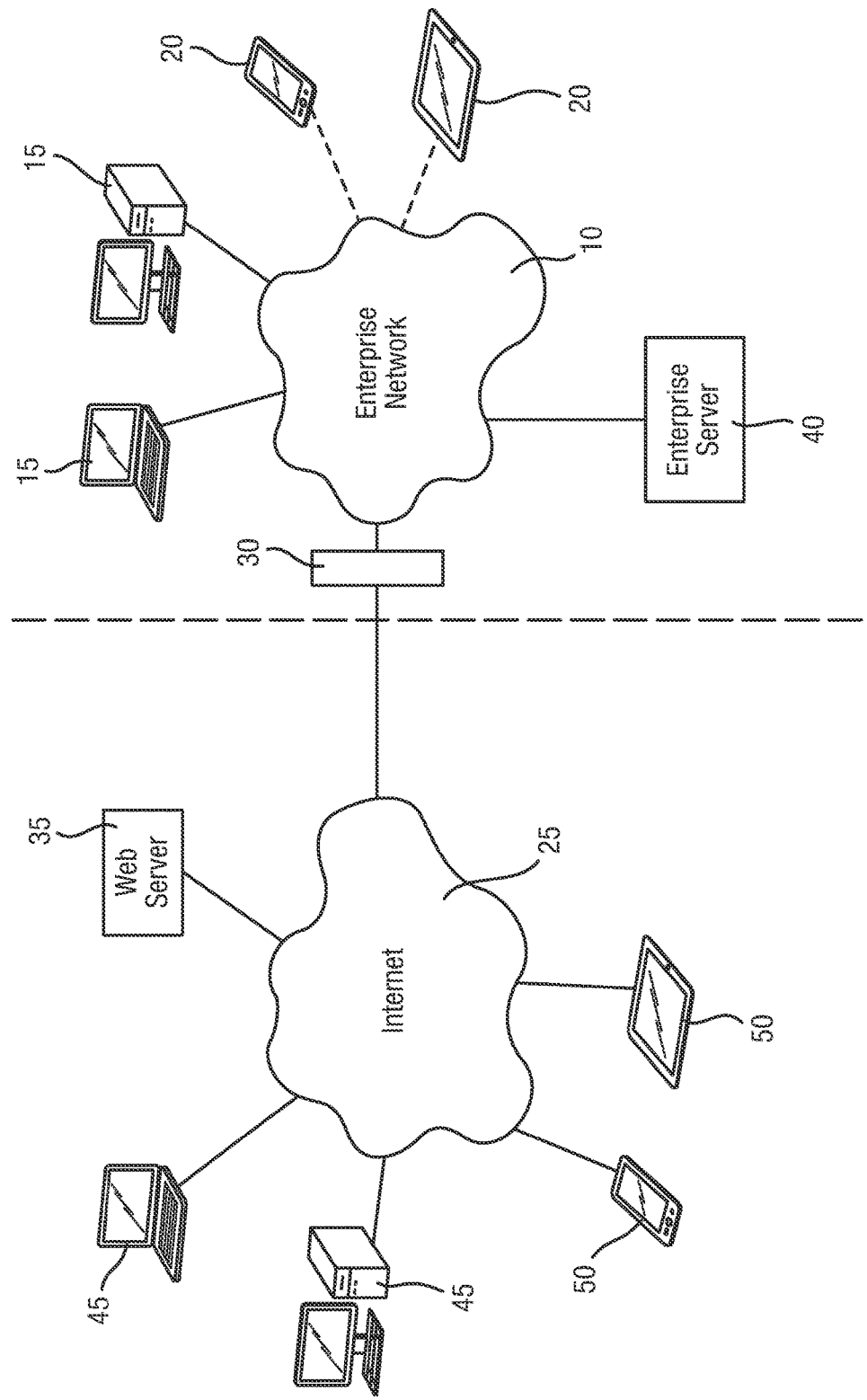
FIG. 1 shows elements in a typical enterprise network arrangement and its connection to a public network such as the Internet.

A typical known enterprise or corporate network arrangement is shown in FIG. 1. Referring to FIG. 1, an enterprise network 10 is provided in the form of a dedicated private network intended for exclusive and controlled access by a closed group of users of corporate terminal devices 15, including desk-top computers linked by fixed network cabling and laptop computers using fixed cable links or secure wireless ('Wi-Fi') links to networks. Through arrangement with one or more selected mobile service providers, corporate mobile communications devices 20 may be provided with access to a limited set of enterprise resources through a respective mobile telecommunications network, not shown in FIG. 1, for example to access enterprise e-mail services using Blackberry® devices.

The enterprise network 10 may be linked to the public Internet 25 by means of a firewall 30 or other secure gateway device arranged to control access to certain Internet resources, e.g. certain web servers 35, by enterprise network users. The firewall 30 is also intended to prevent unauthorised access to the enterprise network 10 and to enterprise resources, for example enterprise servers 40, by external users and by potentially malicious software originating from the Internet 25. External users may include users of terminal devices 45, including personal desk-top computers and laptop computers, having access to the Internet 25 by arrangement with an Internet Service Provider (ISP) (not shown in FIG. 1) and users of mobile communications devices 50, such as smart phones and tablet devices, linked to the Internet 25 via respective mobile telecommunications service provider networks (not shown in FIG. 1).

Users of certain external devices 45, 50 may be arranged with access to enterprise resources 10, 40 over secure communications channels, such as virtual private network (VPN) channels established through the Internet 25 and using secure logon procedures. However, there remains a risk that unauthorised software executing on an Internet user's communications device 45, 50 may intrude upon a communication with the enterprise network 10 and so compromise security. Access to enterprise resources by other than enterprise-issued or controlled devices carries increased risk.

Preferred embodiments of the present invention are intended to provide a solution to the problem of how to provide mobile device access, in particular, to secure enterprise networks 10 and enterprise resources 40 over any mobile telecommunications service provider network. Preferred solutions to this problem, according to the present invention, provide benefits in any situation in which the configuration of mobile devices needs to be controlled dynamically and centrally, for example by the enterprise.

An example of an enterprise network arrangement in a first preferred embodiment of the present invention will now be described with reference to FIG. 2 in which mobile communications devices, modified according to the present invention, may access an enterprise network 10 and enterprise servers 40 over any selected conventional mobile service provider network. Those features shown in FIG. 1 and used also in the embodiment of FIG. 2 without significant modification are indicated using the same reference numerals.

Figure 2:
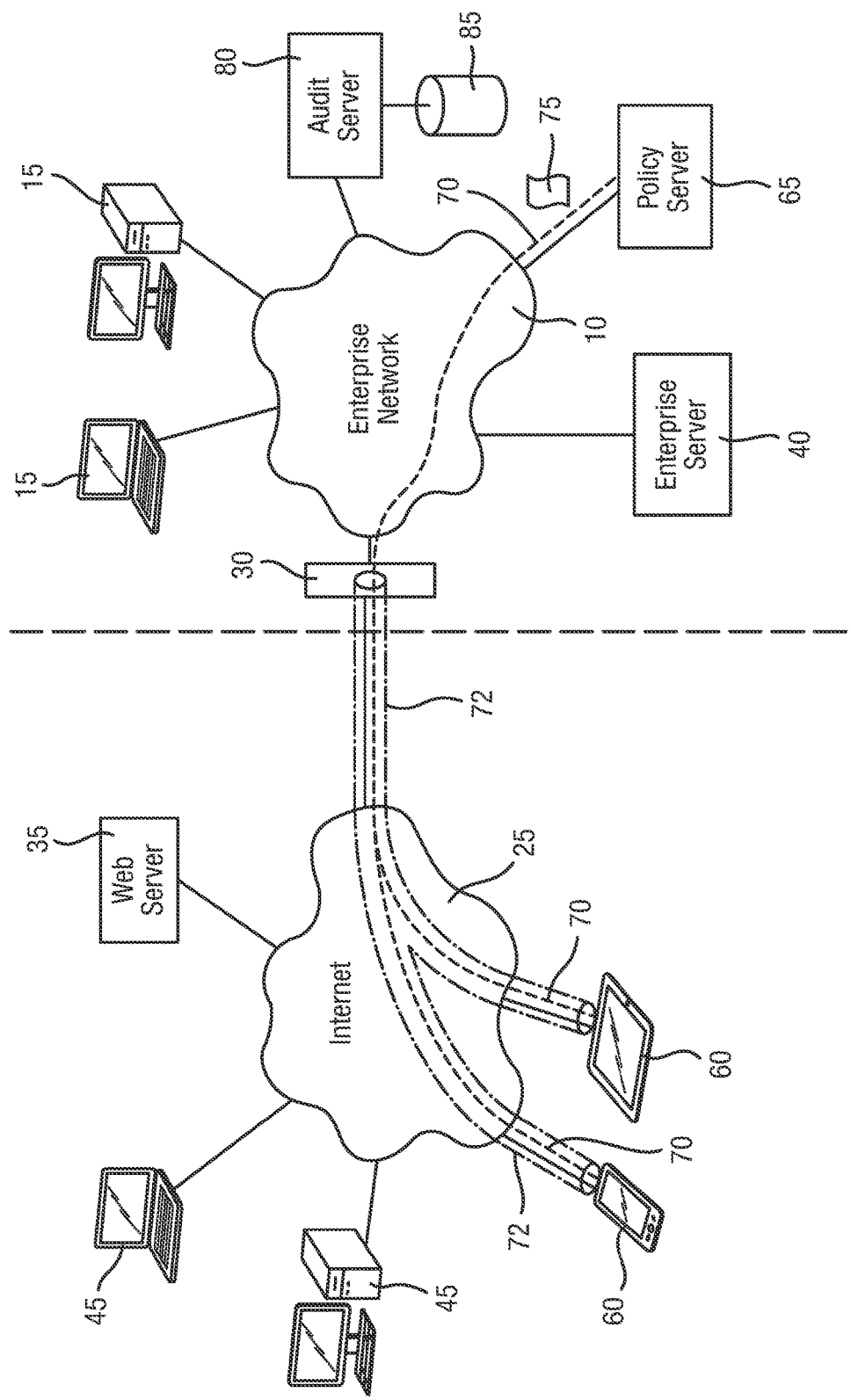
FIG. 2 shows elements in an enterprise network arrangement according to preferred embodiments of the present invention.

Referring to FIG. 2, an enterprise network arrangement is shown, similar to that of FIG. 1, in which an enterprise network 10 is linked to the Internet 25 through a firewall 30. However, besides the conventional enterprise network users 15, users of enterprise-controlled and configured mobile communications devices 60 according to preferred embodiments of the present invention, such as smart phones and tablet devices, may access the enterprise network 10 and servers 40 through any respective mobile telecommunications service provide network (not shown in FIG. 2). The controls required to secure and configure the mobile devices 60 are implemented by an enterprise Policy Server 65 over secure communications channels 70. The secure channels 70 may comprise secure encrypted communications sessions established between a mobile device 60 and the Policy Server 65 via the Internet 25 and any other intervening network, e.g. a respective mobile service provider network. Optionally, these secure channels 70 may implemented over VPN links 72 established between a VPN Client executing on the mobile device 60 and a VPN Server or Concentrator (not shown in FIG. 2) within the control of the Enterprise Network 10 which may be integrated with the Enterprise Firewall 30 or separately deployed. Additional preferred functionality is implemented on the mobile devices 60 themselves to inter-work with the Policy Server 65 over the secure communications channels 70 and to control those aspects of mobile device configuration considered necessary to achieve a predetermined level of security of access to the enterprise network 10 and enterprise resources. This is facilitated in part by a controlled distribution and implementation, on each mobile device 60, of configuration updates issued to the mobile devices 60 by the Policy Server 65 in the form of a published Policy File 75.

Facilities to enable an enterprise to exert centralised control over the configuration of each mobile communications device 60 are central to the present invention. Preferred control mechanisms are implemented on mobile devices 60 at the operating system (OS) level, rather than at the application level, with the intention of removing the option for an unauthorised user to set or over-ride certain configuration settings. The policy file 75 defines some of or all those aspects of a mobile device's configuration and settings necessary to secure the device 60 and to configure it for access to the enterprise network 10 and to enterprise resources. Additional and modified functional features of a mobile communications device 60, according to an embodiment of the present invention, that enable such a device to receive and implement the configuration defined in a policy file 75 will now be described additionally with reference to FIG. 3. By way of example, those functional features will be implemented within the Android® operating system and may be implemented using a combination of new OS modules, modifications to existing OS modules and functionality already available in existing OS modules. However, equivalent functionality may be implemented in other operating systems installed on other types of communications device, whether linked to networks by fixed connections, wireless means in general or mobile communications networks in particular.

Figure 3:
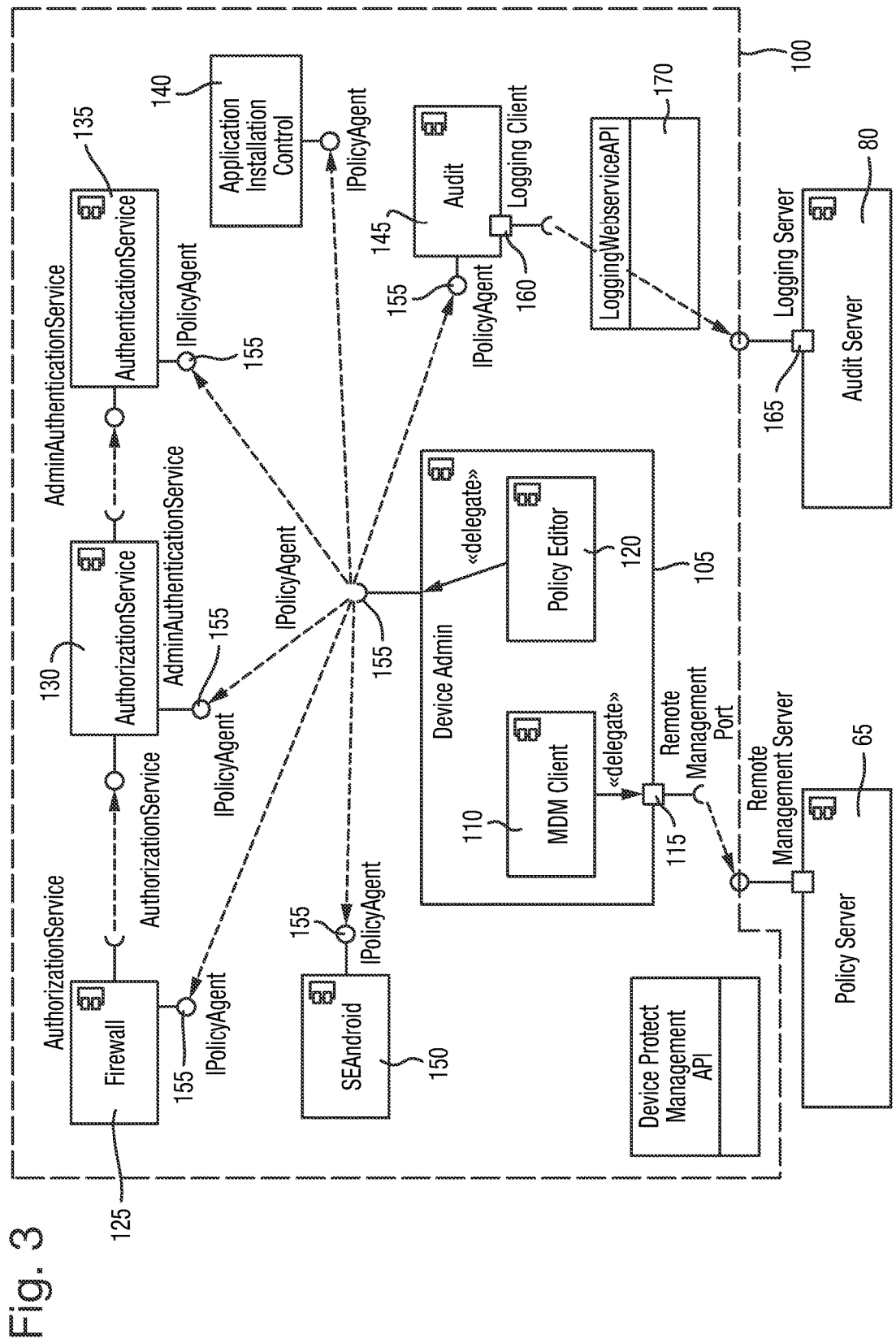
FIG. 3 is a functional block diagram showing a preferred selection of the functional elements of an operating system for a mobile communications device according to a preferred embodiment of the present invention.

Referring to FIG. 3, a functional block diagram is provided to highlight a an arrangement of OS modules in a mobile device 100 according to the present invention, designed to implement a set of functional features enabling central control over the security of the device 100 such that the device 100 may be permitted to connect with the enterprise network 10. A typical OS will of course include other OS modules for implementing other conventional functionality of the device 100 but, for simplicity, only those modules contributing functionality for implementing the present invention are shown in FIG. 3 and described below.

A Device Administration (Admin) module 105 provides the primary interface on the mobile device 100 to the enterprise Policy Server 65, both to receive the content of a Policy File 75, published by the Policy Server 65, and to manage the implementation of a configuration defined in that Policy File 75. When that configuration has been implemented, the Admin module 105 provides an acknowledgement to the Policy Server 65. The Admin module 105 also provides functionality enabling an authorised user to generate a new Policy File 75 on a mobile device 100 and to upload it to the Policy Server 65 for publication and application on other mobile devices 100.

An example of a mechanism for communication of the content of a Policy 75 to mobile devices 100 makes use of the Extensible Messaging and Presence Protocol (XMPP) as defined in Request for Comments (RFC) number 6120, published by the Internet Engineering Task Force (IETF) and accessible through their web site www.ietf.org. In that case the Policy File 75 comprises an XML data structure as defined in a predetermined schema. This mechanism for publication and content communication will be described in more detail below.

One of the main functions of the Admin module 105 is to implement configuration changes on the mobile device 100 as defined in a published Policy File 75. Through the Admin module 105, there are a number of aspects of mobile device configuration that may be controlled by the modified OS of the present invention in accordance with the received content of a published Policy File 75, including but not limited to the following:

1) Firewall Functionality
2) Authorisation
3) Authentication
4) Application Installation and Configuration
5) Audit and Event Logging
6) Settings Lock-down These controls are achieved through a set of modules 125-150 implemented in the OS of the mobile device 100 and provided to control each aspect of the configuration of the device 100 considered necessary to secure the device 100 for access to enterprise resources. A defined interface 155 is established between the Admin module 105 and each of those OS modules 125-150 to enable configuration details specific to each OS module to be transferred from the Admin module 105 and implemented, each OS module providing an acknowledgement message to the Admin module 105 when a respective portion of the defined configuration has been implemented. The identity of each of those OS modules 125-150 and a summary of its respective functionality is as follows:

FIREWALL—a Firewall module 125 is provided to implement conventional firewall functionality, for example detecting and blocking communication of certain protocols to or from the device 100, communications to or from specified applications, or communications to or from a predetermined set of network addresses as defined in a published Policy File 75. The Firewall module 125 may generate event data in the form of alert messages should any such controlled action be attempted by a user or declined.

AUTHORISATION—an Authorisation Service module 130 may be triggered to implement a predetermined authorisation procedure when authorisation for a user-initiated or application-initiated activity is required. For example, an authorisation procedure may be triggered when a user attempts to make certain predetermined types of configuration change that require third-part consent. Similarly, when a user attempts to access a particular network or web site or to install an application not specified on an approved list, as defined in a published Policy File 75, it may be that permission can be granted on consideration by an authorising party if the policy enables that option. However, certain actions may be prohibited without the option of third-party over-ride.

AUTHENTICATION—an Authentication Service module 135 is provided for authenticating a user, with reference to a configurable source of locally or centrally stored reference data, as defined in a published Policy File 75. Such reference data may define authentication details of one or more local users or user groups, where stored on the device 100, or the same reference data may be included in a central authentication data store accessible to all enterprise users, for example an LDAP or other proprietary server.

APPLICATION INSTALLATION CONTROL—an Application Installation Control module 140 is provided for controlling the installation of application software by a user of the device 100. The controls that may be applied are defined in a published Policy File 75 and may include limiting the accessible sources of application programs for the device 100 and defining the specific applications that may be installed and those that may not. The Application Installation Control module 140 may validate an application prior to installation on the basis of its signature (a cryptographic message digest of all or part of the application package), a certificate used to sign the application package cryptographically, the name of the application, or some combination of these properties. The Application Installation Control module 140 calculates these properties for the application being installed and compares them to a predetermined list of rules defined in a published Policy File 75. The rules are defined in terms of these properties and determine whether the application should be allowed or denied. The Application Installation Control module 140 may trigger the Authorisation Service module 130 to arrange for any restrictions imposed by the Application Installation Control module 140 to be subject to Administrator over-ride, if permission for over-ride is included in a rule defined in a published Policy File 75. Alternatively, a non-administrative user may trigger a request for the application to be allowed. The Authorisation Service module 130 may thereby be triggered to alert an authenticated Administrator and to prompt them to choose whether to allow or to reject the proposed download or installation of the application at that time or at some time in the future.

AUDIT—an Audit module 145 is provided for capturing event data generated or detectable within the mobile device 100, as specified in a published Policy File 75, and for communicating those event data to the Audit Server 80. Analysis of the specified event data at the Audit Server 80 or by functionality implemented in the Audit module 145 enables early detection of potential compromises in security either due to user activity or to the attempted actions of unauthorised software—malware—executing on the mobile device 100.

SECURITY—a Security module 150, for example as provided by SE Android (see http://selinuxproiect.org/page/SEAndroid) in the case of an Android implementation, provides additional configurable security features on the mobile device 100. The Policy File 75 may define conditions which restrict inter-process communications or under which applications installed on the device 100 would be prohibited from accessing certain settings and resources on the mobile device 100, such as a camera, microphone, and certain types of stored data, these restrictions being applied by the Security module 150.

According to one embodiment of the present invention, a modified version of the Android operating system is installed on the mobile device 100. The Admin module 105 and the OS modules 125-150 are implemented within the modified Android operating system. A more detailed description will now be provided of the functionality of each of those modules 105, 125-150 and of the implementation of that functionality in Android, with continuing reference to FIG. 3.

The Admin module 105, in a preferred Android implementation, comprises an additional OS module. Communication with the Policy Server 65 is by means of Mobile Device Management (MDM) client software module 110, included within the functionality of the Admin module 105, to perform all communications, including Policy File transfers, over a designated remote management port 115, with a corresponding MDM remote management server module (not shown explicitly in FIG. 3) executing on the Policy Server 65.

In the event that a configuration update is to be implemented on one or more mobile devices 100, a Policy File 75 in the form of an XML data structure is published to a XMPP publication/subscription node and communicated by the Policy Server 65, implemented as an XMPP server, to each of the mobile devices 100 to be updated. Each mobile device 100 is arranged to subscribe to the XMPP publication/subscription node to which the Policy File 75 to be applied has been published. An XMPP connection is made to the XMPP publication/subscription node from each device 100 over the VPN-implemented secure communications channel 70 to download the Policy File content. Transferring the content of the published Policy File 75 over a point-to-point communications channel 70 minimises the risk of interception and modification of the configuration details defined by that content while in transit.

The Admin module 105 is arranged, on receiving the content of a Policy File 75 from the Policy (XMPP) Server 65, to communicate a different respective portion of that content to each of the OS modules 125-150 to implement the defined configuration changes. Each OS Module 125-150 exposes a service which the Admin module 105 is able to bind to. This service implements a standard interface which allows the Admin module 105 to communicate the appropriate portion of the XML file and to receive a status message back from each OS module 125-150. If any of the received status messages indicates a failure to implement any part of the defined configuration, the Admin module 105 issues a roll-back message to all the OS modules 125-150 to ensure that a consistent policy is active on the device 100 at all times.

As indicated above, the Policy File 75 comprises a structured XML text file of configuration data defined according to a predetermined Document Type Definition (DTD) specifically designed to specify the different aspects of mobile device configuration that need to be controlled in order for a mobile device 100 to access the enterprise network 10 and enterprise resources. A Policy File 75 comprises multiple sections, each section defining the configuration settings to be implemented by a different one of the OS modules 125-150. However, certain configuration settings relating to the Admin module 105, in particular, may be defined at the time of installation of the operating system on the mobile device 100 when it is preferably connected physically to an enterprise-controlled installation server (not shown in FIG. 3). For example, addressing and verification information for the enterprise Policy Server 65, the enterprise Audit Server 80 and for the mobile device 100 may be stored on the device 100 at the time of OS installation. These data enable secure communications links to be established by the mobile device 100 with the Policy Server 65 and Audit Server 80, and enable the mobile device 100 to be validated by those servers as a valid source and destination for communicated messages and data.

The Admin module 105 also includes a Policy Editor module 120 for use by authorised users, in particular by an Administrator, to edit a Policy File 75 on the device 100 and to upload it to the Policy Server 65 for wider implementation.

The Android operating system provides a standard firewall, based upon Linux IPTables, arranged to control access to IP addresses stored in a table of blocked and allowed network addresses, web site URLs, ports and interfaces the device 100 may communicate with. However this standard firewall is not enabled by default. The standard Android firewall may be modified according to the present invention and activated to implement the Firewall module 125 so that, in addition to the standard functionality, the Firewall module 125 is arranged to define and implement configurable controls over which IP addresses may be accessed or not accessed by certain defined applications executing on the mobile device 100, according to a published Policy File 75. Configuration options include the facility to allow a user to access a particular defined IP address or port number using one or more defined applications only. The Policy File 75 structure may include the following configuration details to be implemented by the Firewall module 125:

Firewall: On/Off
Local Modification Permitted: Y/N
IP Addresses Permitted/Blocked (List)
Respective Applications Permitted/Blocked (List), and
Allow all traffic through the VPN: Y/N By way of example, a corresponding section of an XMP Policy File 75 may be as follows:
XML:

```
<firewall>
    <settings>
        <setting name="enabled" value="true"/>
        <setting name="app_mode" value="black"/>
        <setting name="ip_mode" value="white"/>
        <setting name="vpn_exempt" value="false"/>
        <setting name="allow_local_changes" value="true"/>
    </settings>
    <ips>
        <ip address="8.8.8.8" port="80" interface="tun0" protocol=
        "tcp"
            listID="black"/>
    </ips>
    <apps>
        <app packageName="com.android.mms" action="block"/>
        <app packageName="com.android.phone" action="custom"
            customListID="customList"/>
    </apps>
</firewall>
```

The Authorisation Service module 130 is provided to implement a predetermined authorisation procedure where an otherwise restricted event is deemed subject to Administrator over-ride according to the published Policy File 75. The Authorisation Service module 130 may incorporate the functionality of SE Android (see for example http://selinux-proiect.org/page/SEAndroid) with the addition of functionality to enable centralised control over the application of SE Android functionality in respect of certain events. The Authorisation Service module 130 may be triggered in response to an Android 'intent' message, generated by any one of the other OS modules 105, 125, 135-150 as required. The events considered to be restricted (such as changing the device PIN code) are specified in the Policy File 75.

In particular the Authorisation Service module 130 allows for configurable control over access by a user or by installed applications to certain settings and resources of the mobile device 100. Android provides a settings database in which all settings are stored. A settings application is also provided within Android to allow configuration changes to be made through alterations to the settings. The settings database contents are generally of the form <Setting Name>-<Value>, e.g. VPN-ON. The SE Android module is modified according to the present invention to implement some functionality arranged, in the event that a setting is to be changed, to check the respective setting name against a list of setting names defining, according to a published Policy File 75, those settings that may be changed, and their permitted values, and those that may not.

Settings may relate to the configuration of the mobile device 100 itself or to applications that may be executed on the device. Typical device-level settings that may be implemented through a Policy File 75 are: the identity of each of the wireless networks that the device 100 may connect to; whether a user may uninstall certain applications; and whether the user is permitted to change the PIN for the device 100. Application level settings may include an identifier for an enterprise e-mail server. Besides being responsive to settings defined in a published Policy File 75, the Security module 150 may also control the settings that a user is permitted to change without further constraint.

If a user requests an unauthorised change to a setting, the Security module 150 may either block the change without further review, or it may trigger the Authorisation Service module 130 to implement an Administrator process, under conditions defined in the Policy File 75. The Administrator process will enable either a remote Administrator to perform or unblock a requested setting change, or to prompt for entry of an administrator password which, if entered correctly, would override the bar to change for that one instance.

Configuration details defined in a Policy File 75 to be implemented by the Security Module 150 may include:
Settings Change: ON/OFF
Local override: Y/N
Permitted <Setting Name>-<Value> combinations
Settings blocked The Authentication Service module 135 is provided to carry out an authentication or validation procedure with respect to a user or a dataset as required by any of the other OS modules 105, 125, 130, 140-150. In particular, with reference to a source of configurable reference data, the Authentication Service module 135 is able to, for example, check that a user's or Administrator's identifying credentials have been correctly entered. The entered credentials are passed to the Authorisation Service module 135 to determine whether the authenticated user is authorised to perform the specified action. If the Authentication Service module 135 receives any further requests for authentication of the same user before a predetermined timeout period expires, it will provide the Authorisation Service module 130 with the user credentials without needing to re-check them. The Authentication Service module 135 will provide user membership details to the Authorisation Service module 130 to establish if a user is a member of a permission-giving group. The Authentication Service module 135 receives respective configuration details provided to the Admin module 105 in a published Policy File 75 and receives those details from the Admin module 105 to update its reference data and functionality. An example of a corresponding portion of XML from a Policy File 75 is given below:

```
<authentication>
    <local>
        <users>
            <user username="user"
                salt="theSaltForUser"
                hash="thePasswordHashForTheUser"/>
        </users>
        <groups>
            <group groupname="group" description="desc"/>
        </groups>
        <memberships>
            <membership groupname="group"
                username="user"
                authenticator="local"/>
        </memberships>
    </local>
    <settings>
        <timeout value="60"/>
    </settings>
</authentication>
```

The Application Installation Control module 140 is implemented within the Android OS of the mobile device 100 with the objective of verifying and otherwise controlling the download and installation of applications software based upon two main configurable levels of control, as may be defined through rules included in the Policy File 175: control over the source of applications for download; and control over the specific applications that may be downloaded. The Application Installation Control module 140 may validate those applications that may be, or have been downloaded before they may be installed and executed on the mobile device 100. The Policy File 175 may specify one or more network addresses of locations from which applications may be downloaded, including for example a link to an enterprise applications server (not shown in the figures) or to another trusted source.

The Policy File 175 may, in addition or alternatively, provide a list of digital signatures, hash values or application software package names for a permitted set of applications and a prohibited set of applications. The Application Installation Control module 140 is arranged to maintain on the mobile device 100 a reference database of digital certificates, signatures and hash values for permitted and prohibited applications as supplied in and updated by the Policy File 175.

The Application Installation Control module 140 is arranged to identify a downloaded application as being either permitted or prohibited by executing software on the device 100 to verify a digital signature, compute a hash value for the downloaded application, or verify a package name and to look for a match on an entry in the reference database. If the calculated signature or hash value matches that of a prohibited application, or if the application would otherwise have been permitted (on the basis of other details, such as a valid certificate) but it appears to have an invalid digital signature or hash value, then installation of the application will be blocked by the module 140 and an error message may be displayed to the user unless the Policy File 175 indicates that over-riding approval by an Administrator is possible. In the latter circumstance, the Application Installation Control module 140 is arranged to generate an 'intent' which may be received by the Authorisation Service module 130 and thereby trigger an Authorisation procedure. The Authorisation procedure may execute either locally at the device 100 (for example if a user with Administrator rights is using the device 100) or it may notify an authorising user elsewhere and invite their participation in the procedure.

Should an installation not be permitted, the application download request may be placed in a "request queue" and the application software may be saved in a temporary space. An administrator may view this request queue on the device 100 and allow or reject requests as appropriate. If the request is rejected, the temporarily stored data is removed from the device 100. If the request is allowed, installation of the application is arranged by generating and sending an intent to an Android PackageInstaller application, removing the temporarily stored data following successful installation.

The controls and checks implemented by the Application Installation Control module 140 are in addition to verification and validation functionality already provided by conventional Android OS modules, e.g. Google Play, which check for known viruses or other malware included in downloaded applications before they can be installed and executed on the mobile device 100.

The Policy File 75 may define the controls to be implemented by the Application Installation Control module 140 through a set of rules using an XML data structure, for example as shown below, in a corresponding portion of the Policy File 75:

```
<AppVerifier>
    <Settings>
        <RequestSpace>5000</RequestSpace>
        <RulesMode>true</RulesMode>
    </Settings>
    <Rules>
        <Rule>
            <PackageName>Example</PackageName>
            <PackageHash>ExampleHash</PackageHash>
            <PackageSignature>ExampleSignature</PackageSignature>
                <RuleType>true<RuleType>
        </Rule>
        <Rule>
```

-continued

```
        <!-- Another rule -->
        </Rule>
    </Rules>
</AppVerifier>
```

If a rule permits Administrator Override then, if a downloaded application fails a defined verification test, administrator over-ride will be permitted and if Central Feedback is enabled, the Authorisation Service module 130 will establish a connection with a central enterprise administrator at a predefined network address to authorise the application installation remotely. If the rule does not permit Central Feedback, then an administrator procedure may be triggered by the Authorisation Service module 130 at the mobile device 100 itself, e.g. to prompt for local entry of an administrator password which may be verified against pre-defined Admin logon credentials stored securely on the mobile device 100. If the rule does not permit Admin Override, then if the downloaded application fails the verification test, an error message will be displayed at the mobile device 100 and installation/execution will be prohibited, at least until some future time, the downloaded application being preferably deleted. A failed attempt may result in an auditable event being logged and communicated as an intent.

The Audit module 145 is implemented in the Android OS with the objective that it is able to receive any predetermined inter-process communication that uses Android intents. Furthermore, a preferred implementation of the Audit module 145 enables the different types of intent that the Audit module 145 may see to be configurable, using an intent filter defined in a published Policy File 75, so that only a predetermined selection of the many different types of intent are reported to the Audit Server 80 or subject to local analysis by the Audit module 145, all others passing through to their intended intent processing. Among the main objectives of this functionality is the logging of certain events that are only easily detectable at the mobile device 100, e.g. failed logon attempts, blocked web site access attempts, configuration changes, SIM card removals, security failures, change of PIN and changes in security settings, to ensure that the mobile device 100 is compliant with predetermined requirements for security auditing. The intents captured in this way are those most likely to indicate user activity, application activity or potential malware activity that may compromise security of the enterprise network 10 and enterprise resources.

The ability of the Audit module 145 to capture any required type of intent is achieved through a modification to the Android Binder to ensure that the intent filter defined according to a published Policy File 75 will have effect ahead of any other intent filter, in particular ahead of any intent filter that may be modified by an application executing on the device 100. In this way, any predetermined type of intent, whether implicit or explicit, may be delivered to a service component of the Audit module 145 so that it can be captured, analysed and reported to the Audit Server 80. The Audit module 145 first packages (according to the defined intent filter) and then uploads captured intents to the Audit Server 80 by means of a Logging Client module 160, executing as part of the Audit module 145, and arranged to establish a secure communications channel with a Logging Server module 165 executing on the Audit Server 80.

Preferably, a Logging Web Service API 170 is provided by the Audit Server to allow simple transmission and upload of log events.

The configuration details relevant to the Audit module 145 as may be defined in a Policy File 75 include the following data structure, noting that each sub-section of a single intent filter can contain an arbitrary number of entries:

```
<Audit>
    <IntentFilters>
        <IntentFilter>
            <Actions>
                <action>android.intent.action.EXAMPLE</action>
            </actions>
            <Categories>
                <category>android.intent.category.EXAMPLE</category>
            </categories>
            <DataTypes>
                <DataType></DataType>
            </DataTypes>
            <DataSchemes>
                <DataScheme></DataScheme>
            </DataSchemes>
            <DataPaths>
                <DataPath></DataPath>
            </DataPaths>
            <DataAuthorities>
                <DataAuthority></DataAuthority>
            </DataAuthorities>
        </IntentFilter>
    </IntentFilters>
</Audit>
```

The Security module 150 is implemented in Android as a modification to the conventional SE Android OS module to provide additional functionality. In a preferred embodiment, the Security module 150 may be arranged to receive inputs from other Android OS facilities, for example relating to device location, motion and other environmental factors, and to apply configurable rules, defined in a published Policy File 75, to control access to certain resources and to control the execution and configuration of certain applications, taking account of the received inputs. Event profiles may be specified through a Policy File 75 to define specific combinations of sensor data indicative of a particular type of event, for example a certain profile of motion sensor data may indicate involvement in a crash, or an otherwise unsafe or security-compromised situation for which an alarm should be raised and GPS tracking enabled. One or more rules may also be defined through the Policy File 75 to trigger one or more predetermined actions when certain events are detected.

For example, if a combination of environmental inputs may be interpreted according to predetermined event profiles to imply that the device 100 is entering a secure environment, then access by applications to the camera and the microphone on the mobile device 100 may be inhibited automatically. Similarly, detection of an event indicative of an unsafe or security-compromised situation, for example if a GPS sensor shows that the mobile device 100 is leaving the UK or entering a predetermined geographical area, may result in the automatic deletion of certain data held on the device, the enabling or disabling of certain applications, enabling of GPS tracking or the triggering of specific power management functions. Detection of a low battery power may trigger the deletion of certain data from the device. In general, certain predetermined events that may be detected by the Audit module 145 through intent messages may be notified to the Security module 150 and may trigger certain configurable responses by the Security module 150. However, the scope of application of this capability is limited only by what can be inferred from the available sensors and data sources on the mobile device 100, using predetermined and configurable event profiles and configurable rules of interpretation, and by what needs to be achieved in a given detectable situation. The rules that govern behaviour of the mobile device 100 in such situations are configurable though appropriate content in a Policy File 75 and through functionality deployed in the OS of the mobile device 100, as would be apparent to a person of ordinary skill in the relevant art.

In one possible implementation, events may be defined in a Policy File 75 in terms of policy 'filters' that may be acted upon by the Device Admin module 105 upon receipt of such a Policy File 75. Filters may be defined in a Policy File 75 in terms of particular combinations of such event data such that defined configuration updates will only be forwarded by the Device Admin module 105 or applied by the respective OS module 125-150 if all the conditions defined by the filter are satisfied. For example, in the following extract from a Policy File 75, a particular set of configuration settings may be applied by the Application Installation Control module 140 according to whether a 'GPS Filter' defining event data relating to mobile device location is triggered:

```
<AppVerifier>
    <Filter FilterName = "GPS Box"
        <Events>
            ....
            <SendSMS To ="      ", Message ="        ">
            <SendGPSToServer>
                <Period = "1 min", minBattery = "50%"/>
                <Period = "10 min", minBattery = 1%, max =
                50%/>
            </SendGPSToServer>
        </Events>
        <Settings>
            <RequestSpace>5000</RequestSpace>
            <RulesMode>true</RulesMode>
        </Settings>
        <Rules>
            <Rule>
                <PackageName>Example</PackageName>
                <PackageHash>ExampleHash</PackageHash>
<PackageSignature>ExampleSignature</PackageSignature>
                <RuleType>true<RuleType>
            </Rule>
            <Rule>
                <!-- Another rule -->
            </Rule>
        </Rules>
    </Filter>
</AppVerifier>
```

The Admin module 105 may be arranged, for example, to receive sensor and other event data through intents generated by other OS modules on the mobile device 100. The Admin module 105 may thereby have the information available to determine whether particular filter event data conditions are satisfied and a particular portion of a Policy File 75 should be implemented by a respective OS module 125-150. Alternatively, each OS module 125-150 may receive a relevant section of a Policy File 75 including one or more filters and may also receive event data from other OS modules such that it is able to determine when particular filter conditions are satisfied. If a filter is triggered, the OS module 125-150 implements the defined configuration and sends an acknowledgement message to the Device Admin module 105 as usual.

In a further example embodiment of the present invention, a Policy File 75 may be assembled as a combination of sub-policies, each sub-policy being defined in a Policy File 75 of its own. Functionality may be implemented on the Policy Server 65 to enable a Policy File 75 to be created from a number of smaller sub-policy files, the sub-policy files having one or more different origins or relating to one or more different groups of users of mobile devices 100. In this way, an Enterprise may define a 'base level' policy applicable to all enterprise users, but different departments or user groups may have the flexibility to generate and overlay their own sub-policies onto the base policy to create a policy that will be published via the Policy Server 65.

Additionally, a policy layering scheme may be defined under which different layers of policy may be defined with a relative priority marking assigned to policy elements defined in each layer. In this way, the Admin module 105 may be arranged to take account of different indicated priority markings when implementing policy updates defined in a received Policy File 75. In particular, those elements of policy associated with Layer 1 of the policy hierarchy may represent the 'base' policy such that policy updates associated with Layer 2 may or may not be permitted to over-ride configuration features already defined in the base policy at Layer 1. By way of example, an extract from a Policy File 75 may include the following XML defining relative priorities associated with particular OS modules 125-150 for Layer 1 of the policy:

```
<DeviceProtectPolicy layer="1">
    <Firewall override="false">
    ...
    </Firewall>
    <AppVerifier override="true">
    ...
    </AppVerifier>
</DeviceProtectPolicy>
```

If a subsequently received Policy File 75 defines Layer 2 or higher layer policy elements, those elements may or may not be permitted to over-ride the Layer 1 settings of the respective OS module 125-150 according to whether the Layer 1 policy permits such over-ride.

In one example implementation of a policy layering scheme, different layers of Policy may be associated with different layers of security requirement in an Enterprise. The base Layer 1 may define those configuration elements required in mobile devices 100 operating at the highest level of security. However, certain user groups may be permitted greater flexibility, for example in exchange for more limited access to Enterprise resources. An alternative Layer 2 configuration may therefore be defined, certain elements of which may be permitted, by the Layer 1 policy, to over-ride Layer 1 settings for particular OS modules 125-150.

Filters, as discussed above, may also be applied to a layered policy structure such that besides the application of policy over-ride conditions in respect of higher-layer policy elements, event data may also be taken into account when determining the particular policy elements to be applied to a mobile device 100 at any given time.

The present invention includes any combination of the features described above as would be apparent to a person of ordinary skill in the relevant art. For example, centralised control over the configuration of a mobile communications device may be limited to any one or more of the different aspects of device configuration described, or may include control over any other known aspect of mobile device configuration as may be achieved through a modification to existing OS modules or by the addition of OS modules according to the principles and methods described above.

The invention claimed is:

1. A communications device for accessing, by a first network, data resources hosted on a second network, the communications device having a processor for executing an installed operating system, the operating system incorporating:
   an interface module executable by the processor and configured for communicating with a defined policy server on the second network to receive, via a secure communications channel, a policy file therefrom defining a configuration to be implemented by and within the operating system of the communications device, wherein the configuration is defined as a layered hierarchy of configuration sub-policies, including rules by which configuration elements associated with one layer may over-ride configuration elements associated with a different layer of the hierarchy and wherein the one or more control mechanisms for controlling the implementation of the configuration are arranged to apply said rules in the implementation of the configuration on the communications device;
   one or more control mechanisms executable by the processor and configured for controlling the implementation of the configuration, by one or more respective modules of the operating system;
   wherein the configuration defines one or more actions to be triggered by the operating system of the communications device upon detection of a predetermined event, the predetermined event comprising the presence of the communications device at or near to a predetermined location; and
   one or both of:
      a sub-policy associated with a base layer of the hierarchy that comprises a base configuration to be applied to all communications devices arranged with access to the second network, and
      a sub-policy associated with a layer other than the base layer of the hierarchy that is defined for implementation on a communications device associated with each of a sub-group of users having access to the second network.

2. The communications device according to claim 1, wherein the policy file defines, according to a predetermined structure, different portions of the configuration to be implemented by different modules of the operating system and wherein the one or more control mechanisms for controlling the implementation of the configuration are arranged to make each said different portion of the configuration available to the respective module of the operating system for implementation.

3. The communications device according to claim 1, wherein the configuration defines the secure communications channel by which a user of the communications device may access the data resources hosted on the second network.

4. The communications device according to claim 1, having one or more installed sensors and wherein the predetermined event further comprises detection of a predetermined combination of sensor data from the one or more sensors.

5. The communications device according to claim 4, wherein the one or more actions include at least one of:
   control of access, by applications software executing on the communications device, to defined facilities provided by the operating system,
   control of access to data from the one or more sensors;
   deletion of predetermined types of data from the communications device;
   control of access to defined network addresses on the first or second networks;
   control of access to communications facilities of the communications device;
   sending of a message to a defined recipient on the first or second network; and
   sending of an indication of the location of the communications device to a defined recipient on the second network.

6. The communications device according to claim 4, wherein the one or more actions include restriction of access to data from the one or more sensors upon detection of the presence of the communications device at or near to a predetermined location.

7. The communications device according to claim 1, wherein the configuration defines a policy filter, the policy filter defining one or more conditions for implementation of a respective portion of the configuration and wherein the one or more control mechanisms for implementing the configuration are arranged, upon detection of a defined filter condition, to trigger implementation of a respective portion of the configuration.

8. The communications device according to claim 7, wherein the policy filter defines one or more events or event combinations detectable by the operating system of the communications device.

9. The communications device according to claim 1, the operating system further comprising a policy editor for enabling an authorised user to generate and to transfer to the policy server at least a portion of a policy file defining one or more elements of a configuration for implementation on one or more further communications devices.

10. The communications device according to claim 9, wherein the policy editor is further configured for testing the one or more user-defined elements of a configuration on the communications device before transfer to the policy server.

11. The communications device according to claim 1, the operating system further comprising an audit module for capturing event data generated by modules of the operating system according to a configuration defined in the received policy file, and for transmitting the captured event data to an audit server hosted on the second network.

12. The communications device according to claim 1, wherein the one or more control mechanisms for controlling implementation of the configuration includes a roll-back facility to restore an earlier state of configuration for the communications device.

13. The communications device according to claim 1, wherein the policy file defines a configuration using a file structure defined according to a predetermined XML schema.

14. The communications device according to claim 1, wherein the communications device is a mobile communications device and the first network is a mobile communications network.

15. The communications device according to claim 1, wherein the predetermined event further comprises detection of a predetermined battery charge level.

16. The communications device according to claim 1, wherein the predetermined event further comprises detection of a predetermined communications event relating to the first or the second network.

17. The communications device according to claim 1, wherein the predetermined event further comprises receipt of a predetermined signal or signal type over an interface of the communications device.

18. The communications device according to claim 1, wherein the predetermined event further comprises detection of a predetermined profile of motion of the communications device.

19. The communications device according to claim 1, wherein the predetermined event further comprises detection of an unsafe condition.

20. The communications device according to claim 1, wherein the predetermined event further comprises detection of a predetermined status condition.

21. A communications system, comprising a first network and a second network and a plurality of communications devices linked to the first network and configured to enable users of those devices to access data resources linked to the second network, the second network having a policy server linked thereto to transmit, via a secure communications channel, to selected ones of the plurality of communications devices a policy file defining a configuration to be implemented on the selected communications device as a condition for access to data resources linked to the second network, wherein each of the plurality of communications devices includes a processor for executing an installed operating system, the operating system incorporating:
 a processor-executable interface module configured for communicating with the policy server to receive, by said secure communications channel, a policy file therefrom defining a configuration to be implemented by and within the operating system of the communications device, wherein the configuration is defined as a layered hierarchy of configuration sub-policies, including rules by which configuration elements associated with one layer may over-ride configuration elements associated with a different layer of the hierarchy and wherein the one or more control mechanisms for controlling the implementation of the configuration are arranged to apply said rules in the implementation of the configuration on the communications device;
 one or more control mechanisms for controlling the implementation of the configuration, by one or more respective modules of the operating system;
 wherein the configuration defines one or more actions to be triggered by the operating system of the communications device upon detection of a predetermined event, the predetermined event comprising the presence of the communications device at or near to a predetermined location; and
 one or both of:
  a sub-policy associated with a base layer of the hierarchy that comprises a base configuration to be applied to all communications devices arranged with access to the second network, and
  a sub-policy associated with a layer other than the base layer of the hierarchy that is defined for implementation on a communications device associated with each of a sub-group of users having access to the second network.

22. The communications system according to claim 21, wherein one or more of the plurality of communications devices is a communications device according to claim 1.

23. A computer program product comprising a non-transitory computer readable medium having stored thereon a computer program which, when installed and executed on a communications device, causes a process to be carried out, the process comprising:
 communicating, by an interface module executable by a processor of the communication device, with a defined policy server on a second network to receive, via a secure communications channel, a policy file therefrom defining a configuration to be implemented by and within an operating system of the communications device, wherein the configuration is defined as a layered hierarchy of configuration sub-policies, including rules by which configuration elements associated with one layer may over-ride configuration elements associated with a different layer of the hierarchy and wherein the one or more control mechanisms for controlling the implementation of the configuration are arranged to apply said rules in the implementation of the configuration on the communications device;
 controlling, by one or more control mechanisms executable by the processor, the implementation of the configuration, by one or more respective modules of the operating system;
 wherein the configuration defines one or more actions to be triggered by the operating system of the communications device upon detection of a predetermined event, the predetermined event comprising the presence of the communications device at or near to a predetermined location; and
 one or both of:
  a sub-policy associated with a base layer of the hierarchy that comprises a base configuration to be applied to all communications devices arranged with access to the second network, and
  a sub-policy associated with a layer other than the base layer of the hierarchy that is defined for implementation on a communications device associated with each of a sub-group of users having access to the second network.

* * * * *